US012688783B2

(12) United States Patent
Strong et al.

(10) Patent No.: US 12,688,783 B2
(45) Date of Patent: Jul. 21, 2026

(54) APPROACH SYSTEM SELECTION

(71) Applicant: Honeywell International Inc.,
Charlotte, NC (US)

(72) Inventors: Sidney Strong, Kenmore, WA (US);
Vignesh Krishnan, Olathe, KS (US)

(73) Assignee: Honeywell International Inc.,
Charlotte, NC (US)

( * ) Notice: Subject to any disclaimer, the term of this
patent is extended or adjusted under 35
U.S.C. 154(b) by 219 days.

(21) Appl. No.: 17/833,606

(22) Filed: Jun. 6, 2022

(65) Prior Publication Data

US 2023/0394983 A1     Dec. 7, 2023

(51) Int. Cl.
| | |
|---|---|
| *G08G 5/54* | (2025.01) |
| *B64D 45/04* | (2006.01) |
| *G08G 5/21* | (2025.01) |
| *G08G 5/26* | (2025.01) |
| *G08G 5/30* | (2025.01) |

(52) U.S. Cl.
CPC .............. *G08G 5/54* (2025.01); *B64D 45/04*
(2013.01); *G08G 5/21* (2025.01); *G08G 5/26*
(2025.01); *G08G 5/30* (2025.01)

(58) Field of Classification Search
CPC .... G08G 5/025; G08G 5/0013; G08G 5/0021;
G08G 5/003; G08G 5/0039; B64D 45/04
USPC ......................................................... 701/16
See application file for complete search history.

(56) References Cited

U.S. PATENT DOCUMENTS

| | | | |
|---|---|---|---|
| 7,145,501 B1 * | 12/2006 | Manfred | ................. G01S 13/89 |
| | | | 342/120 |
| 7,693,621 B1 | 4/2010 | Chamas | |
| 8,121,747 B2 * | 2/2012 | Loots | ................... G01C 23/005 |
| | | | 244/175 |
| 8,489,261 B2 | 7/2013 | Albert et al. | |
| 9,002,544 B1 | 4/2015 | Seah et al. | |
| 9,310,222 B1 * | 4/2016 | Suiter | ................. G08G 5/0091 |
| 9,766,091 B2 | 9/2017 | Caillaud et al. | |
| 9,911,343 B2 | 3/2018 | Jeong et al. | |

(Continued)

FOREIGN PATENT DOCUMENTS

EP          3517895 A1      7/2019

OTHER PUBLICATIONS

European Patent Office, "Extended European Search Report", from
EP Application No. 23174164.6, from Foreign Counterpart to U.S.
Appl. No. 17/833,606, filed Oct. 20, 2023, pp. 1 through 7,
Published: EP.

(Continued)

*Primary Examiner* — Andrew R Dyer
(74) *Attorney, Agent, or Firm* — Fogg & Powers LLC

(57) ABSTRACT

Systems and methods for approach system selection are
provided herein. In certain embodiments, a method includes
receiving an approach identifier. Further, the method
includes identifying a plurality of approach modes associ-
ated with the approach identifier. Additionally, the method
includes selecting an approach mode in the plurality of
approach modes based on an integrity measure of navigation
guidance associated with separate approach modes in the
plurality of approach modes. Moreover, the method includes
providing the navigation guidance for the selected approach
mode to an approach system for guiding a vehicle through
an approach for the selected approach mode.

14 Claims, 6 Drawing Sheets

(56) References Cited

U.S. PATENT DOCUMENTS

| | | | | |
|---|---|---|---|---|
| 2006/0041345 A1* | 2/2006 | Metcalf | B64D 45/0031 | |
| | | | | 340/5.2 |
| 2009/0043433 A1* | 2/2009 | Markiton | G01C 23/005 | |
| | | | | 701/16 |
| 2012/0158221 A1* | 6/2012 | Al Fadhli | G05D 1/0083 | |
| | | | | 701/16 |
| 2013/0300587 A1* | 11/2013 | Wyatt | G08G 5/0021 | |
| | | | | 340/972 |
| 2014/0249703 A1* | 9/2014 | He | G01C 23/005 | |
| | | | | 701/16 |
| 2014/0277857 A1 | 9/2014 | Bourret et al. | | |
| 2014/0350755 A1 | 11/2014 | Caillaud et al. | | |
| 2016/0107749 A1* | 4/2016 | Mucci | B64C 39/024 | |
| | | | | 701/3 |
| 2018/0261110 A1 | 9/2018 | Dautermann et al. | | |
| 2019/0197906 A1* | 6/2019 | Bourret | G08G 5/025 | |
| 2019/0236965 A1* | 8/2019 | Zhang | G08G 5/025 | |
| 2021/0201685 A1* | 7/2021 | Han | G08G 5/34 | |
| 2022/0101739 A1 | 3/2022 | Mulryan et al. | | |

OTHER PUBLICATIONS

European Patent Office, "Communication pursuant to Article 94(3)EPC", dated Jul. 15, 2025 from EP Application No. 23174164.6, from Foreign Counterpart to U.S. Appl. No. 17/833,606, pp. 1 through 5, Published: EP.

* cited by examiner

500

APPROACH SYSTEM SELECTION

BACKGROUND

Multiple landing systems may be available to provide approach information to aircraft to help the aircraft safely land on a specific runway. The approach information may include course and glidepath guidance that helps the aircraft follow a desired approach path towards the runway. During the approach towards the runway, a flight crew member may tune a receiver or other similar device to a mode, frequency, and/or channel associated with one of the landing systems for the runway. After tuning the receiver to the mode/frequency/channel, the selected landing system is used as the basis for providing navigation guidance to the aircraft in relation to the desired approach path for the runway.

SUMMARY

Systems and methods for approach system selection are provided herein. In certain embodiments, a method includes receiving an approach identifier. Further, the method includes identifying a plurality of approach modes associated with the approach identifier. Additionally, the method includes selecting an approach mode in the plurality of approach modes based on an integrity measure of navigation guidance associated with separate approach modes in the plurality of approach modes. Moreover, the method includes providing the navigation guidance for the selected approach mode to an approach system for guiding a vehicle through an approach for the selected approach mode.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific, illustrative embodiments. However, it is to be understood that other embodiments may be used and that logical, mechanical, and electrical changes may be made.

The present disclosure describes systems and methods for selecting approach systems. Some vehicles receive navigation guidance during an approach towards a destination. For example, aircraft may receive approach guidance when approaching a runway. The approach guidance helps the aircraft be at an appropriate decision height when a pilot decides to land or abort the landing attempt.

Many approach systems have been designed that use different methods and equipment to provide approach guidance to aircraft. Because of the different methods and equipment, the different approach systems have different capabilities and are subject to various issues that can impair approach system performance. The present disclosure describes methods and systems for selecting an appropriate approach system that engages with associated approach facilities at a runway, or other destination, based on quality measures of the available approach systems. By selecting an approach system based on a quality measure, the methods and systems described herein may reduce the attention needed from individuals when selecting an approach system, allowing the individuals to focus on landing the aircraft and any emergencies that could arise.

Figure 1:
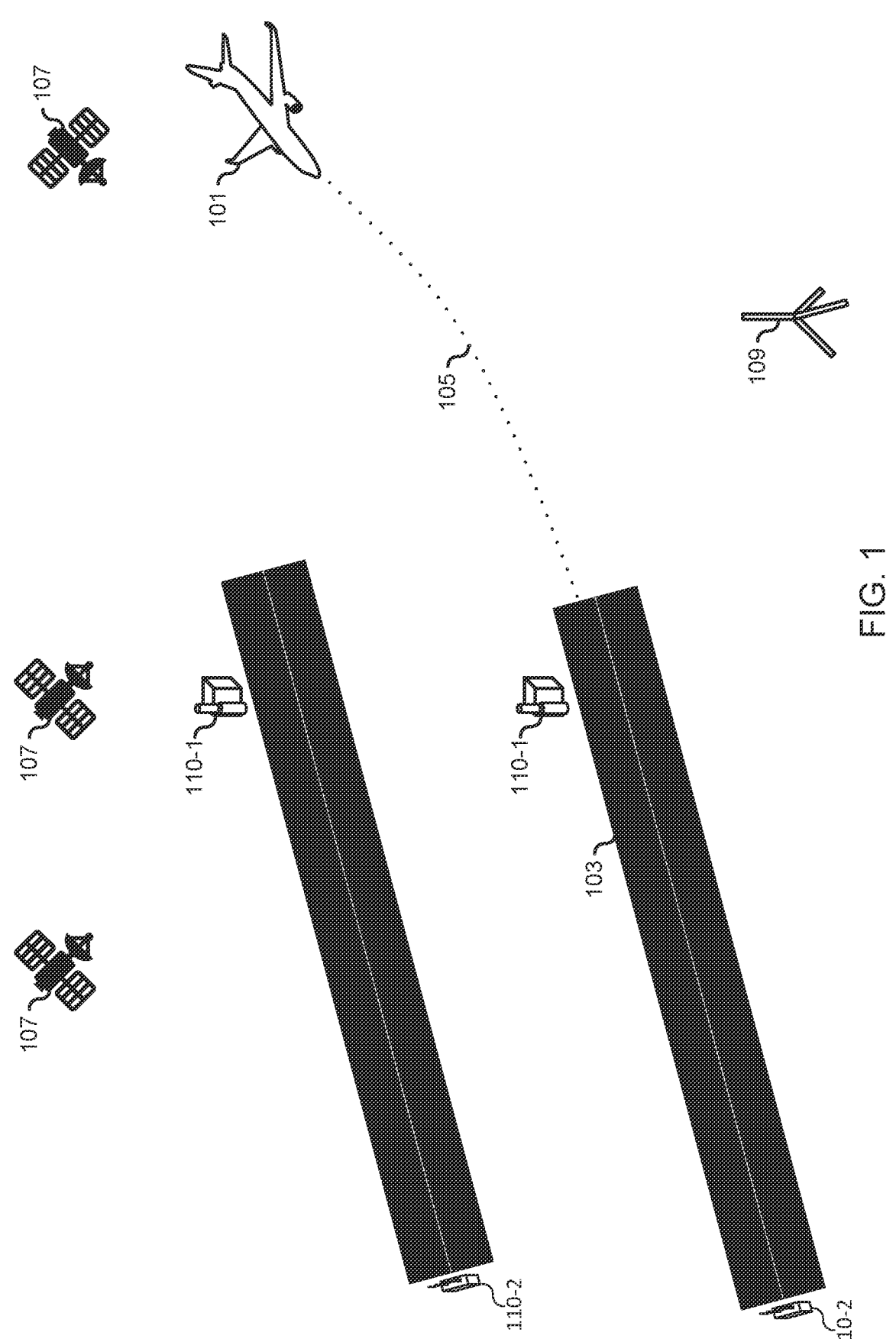
FIG. 1 is a diagram of an aircraft approaching a runway according to an aspect of the present disclosure.

FIG. 1 is a diagram illustrating an aircraft 101 approaching a runway 103 for landing. The term "aircraft," as used herein, may refer to any vehicle capable of flying, including airplanes, helicopters, drones, rockets, missiles, and the like. Alternatively, while the description may use the term "aircraft," the teachings described herein may apply to vehicles generally. Vehicles may include automobiles, boats, submarines, among other vehicles. Accordingly, embodiments described herein that apply to aircraft may apply to vehicles generally.

As shown, the aircraft 101 approaches a runway 103 for landing. When landing, the path followed by an aircraft 101 towards a runway 103 may determine whether the aircraft 101 can successfully land at the runway 103. Accordingly, an aircraft 101 may follow a feeder route, where the aircraft 101 moves from the en route structure to an initial approach segment. During the initial approach segment, the aircraft 101 positions itself for an intermediate or final approach segment. At the final approach segment, the aircraft 101 follows an approach path 105 or glidepath down to the runway 103. As runways are located at different locations, having different surrounding geography, the approach paths can vary from runway to runway.

Frequently, approach facilities can be installed at or be associated with runways 103 that support different approach procedure(s). The facilities include ground-based approach facilities 109 and 110 or airborne approach facilities 107. The facilities provide signals to an approach system on the aircraft to guide the aircraft 101 along the approach path 105. The term "approach system," as used herein, refers to an integrated system located on a vehicle (like the aircraft 101) that exchanges information with the approach facilities to aid the approach of the vehicle towards a particular destination. For example, an approach system may receive signals from the ground-based approach facilities 109 and 110 to support an instrument landing system (ILS), a ground-based augmentation system (GBAS) landing system (GLS), or other types of ground-based approach facilities 109 and 110 that aid a vehicle during an approach towards a runway 103 or other destination. Also, an approach system may receive signals from the airborne approach facilities 107 to support a GLS, a localizer performance with vertical guidance landing system (LPV), or other types of airborne approach facilities 107 that are designed to aid a vehicle during an approach towards a runway 103 or other destination.

As mentioned above, the ground-based approach facilities 109 and 110 may be associated with the runways 103 to support the operations of approach systems on aircraft approaching the runways 103. For example, the ground-based approach facilities 109 may be associated with multiple runways 103 at one airport or runways 103 at multiple airports, such as ground-based approach facilities used to support GLS approach systems. Additionally, the ground-based approach facilities 109 may be specific to a particular runway 103, such as the ground-based approach facilities 110, which may include a glide-slope station 110-1 and a localizer station 110-2 with each runway such as those used to support ILS approaches. Additionally, the runways 103 may be associated with various combinations of ground-based approach facilities 109 and 110 and airborne-based approach facilities 107 to support different combinations of approach systems.

Guidance signals provided by the different airborne approach facilities 107 and the different ground-based approach facilities 109 and 110 may have different levels of accuracy and, potentially, may be affected by different sources of error. For example, GLS and LPV approach systems may use measurements from GNSS satellites 107 when providing guidance signals. GNSS satellites may be subject to availability issues, such as the loss of signals from a satellite due to blocking of the signals by the aircraft 101 during maneuvers of the aircraft 101. Additionally, environmental issues (such as spoofing, interference, etc.) may affect the integrity of the resultant measurements. ILS approach systems may be sensitive to obstructions, terrain changes, and potential reflections of transmitted signals within a signal broadcast area. Also, an ILS approach system may receive a notice (such as a notice to airman (NOTAM)) indicating that the ground-based approach facilities 110 are experiencing an outage or limiting the approaches that can be performed by the aircraft 101. Because of the different benefits and potential drawbacks provided by different approaches, different approach systems may be desirable for use during different situations.

Typically, when an aircraft 101 approaches a runway 103, the pilot or other crew member may receive instructions from an air traffic controller (ATC) instructing the pilots to use particular approach instructions until the aircraft 101 arrives at a particular location, where the pilot may then select a particular approach mode. When selecting the approach mode, the pilot or crew may use the approach system on the aircraft to select one of several potential approach modes. After selecting one of the potential approach modes, the pilot or equipment on the aircraft 101 determines whether or not the selected approach mode is supported by facilities associated with the runway 103. If the selected approach mode is supported, the pilot or equipment can then determine whether the selected approach mode provides navigation guidance with sufficient integrity or whether the approach mode can safely guide the aircraft along an approach path. If the selected approach mode is unavailable or fails to provide sufficiently safe guidance, the pilot may use the onboard instrumentation to select another potential approach mode. The pilot may repeat the above-described process for selecting an approach mode and checking if the selected approach mode provides sufficiently safe navigation guidance until the pilot selects an approach mode supported by facilities associated with the runway 103 that provides sufficiently safe navigation guidance to the aircraft 101. This typical approach for selecting approach systems unduly burdens the time and attention of the pilot when preparing the aircraft 101 for landing on the runway 103.

In exemplary embodiments, the aircraft 101 may have an onboard approach system that allows a pilot to provide just an approach identifier to the approach system to select an approach mode. The approach system uses the approach identifier to acquire information about the approach modes associated with the approach identifier and then determines which of the available approach modes provides navigation measurements with the highest integrity, highest probability of availability, or other quality measure. When the approach system selects the approach mode, the approach system may begin to generate navigation guidance for guiding the aircraft 101 down the approach path 105 to land safely on the runway 103. As used herein, the term "approach identifier" may refer to information that identifies the approach destination. For example, the approach identifier may identify a runway or other type of approach destination. As used herein, the term "quality measure" may refer to a quantitative measurement of the usability of the navigation guidance provided for a specific approach mode and may include measurements of integrity, accuracy, continuity, and the like.

In exemplary embodiments, implementing an approach system that evaluates the available approach modes for an approach identifier decreases a pilot's workload during a final approach. The reduction of workload may enable the pilot to perform other vital duties related to the planning and execution of the approach of the aircraft 101 towards the runway 103.

Figure 2:
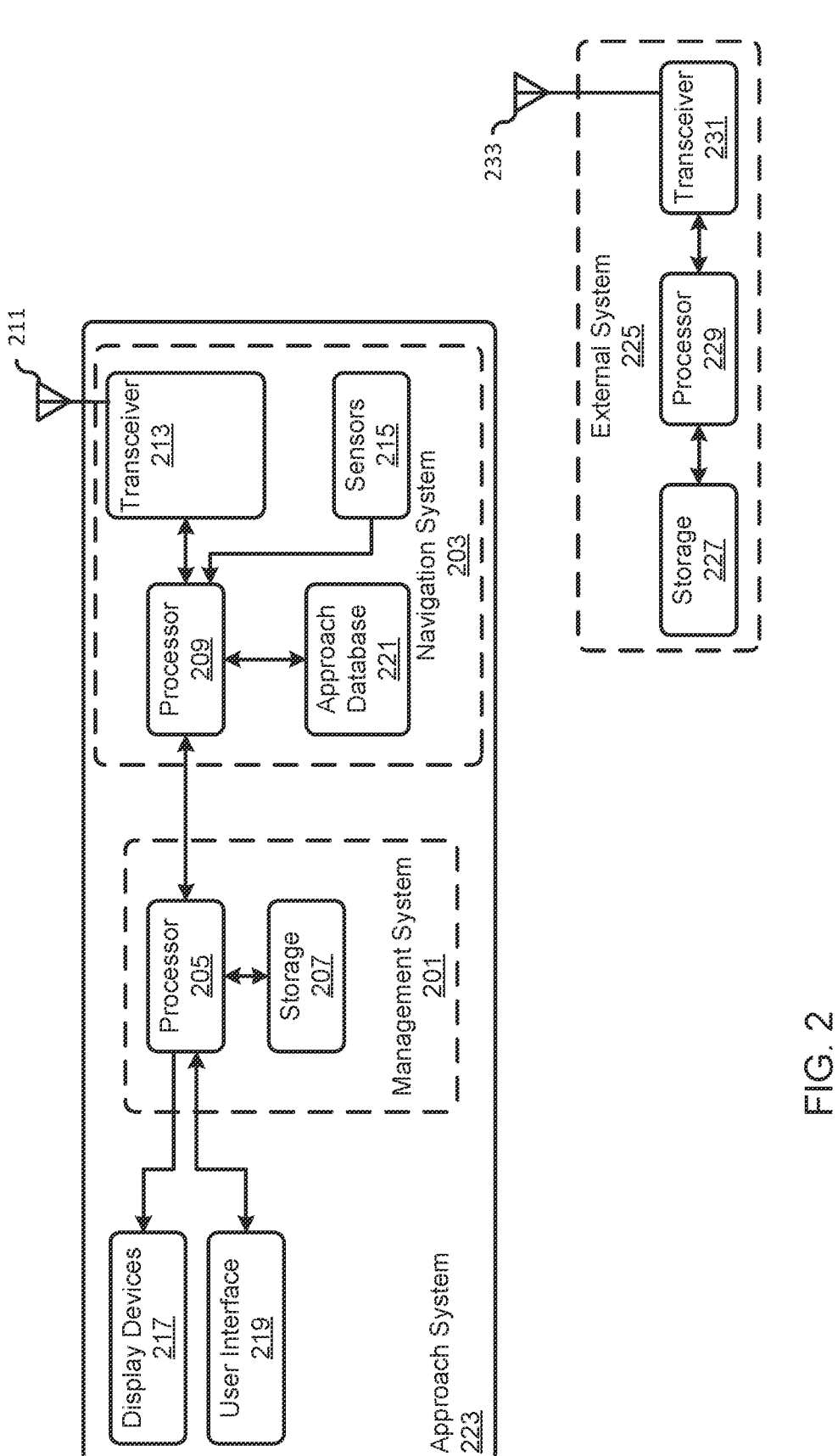
FIG. 2 is a diagram of a system configured to perform an approach system selection according to an aspect of the present disclosure.

FIG. 2 is a block diagram of a system 200 for selecting an approach mode. The system 200 includes an approach system 223 and an external system 225. The approach system 223 may reside on a vehicle, such as the aircraft 101 in FIG. 1. The approach system 223 may receive an approach identifier and identify an approach mode for use by a vehicle performing an approach towards a final destination. At times, the approach system 223 may communicate periodically with one or more external system(s) 225. The external system(s) 225 may provide information to the approach system 223 regarding the approach modes associated with a particular approach identifier. Alternatively, the external system(s) 225 may provide approach information regarding multiple approach modes associated with multiple approach identifiers for later use by the approach system 223.

In certain embodiments, the approach system 223 may include a management system 201 and a navigation system 203. While illustrated as separate components, the management system 201 and the navigation system 203 may operate as the same component. For example, when operating as the same component, the same computational resources may function as the navigation system 203 and the management system 201. Alternatively, separate (either physically separate or through partitioning) computational resources may function as the management system 201 and the navigation system 203. When the management system 201 and the navigation system 203 are separately or independently functioning systems, some of the functionality described as being performed by the navigation system 203 may be performed by the management system 201 and vice versa.

In exemplary embodiments, the management system 201 may store information about the travel of a vehicle associated with the approach system 223. For example, the management system 201 may be a communication management unit, a flight management system, or other device for managing and controlling various devices and systems within the approach system 223 and onboard the vehicle. Further, when the vehicle is an aircraft, the management system 201 may store flight information, such as flight plans, and manage information received through the various devices on the aircraft. For example, the management system may connect to devices, such as a user interface 219 and display devices 217. Additionally, the management system 201 may receive navigation solutions and other navigation information from the navigation system 203. In some implementations, the management system 201 receives navigation information from the navigation system 203 and calculates guidance information related to an approach path. Alternatively, the management system 201 may receive guidance information from the navigation system 203.

As illustrated, the management system 201 may include a processor 205 and storage 207. The processor 205 may execute computer-readable instructions that direct the processor 205 to perform management tasks for the approach system 223. For example, as stated above, the management system 201 may be connected, through various interfaces, to multiple devices within the approach system 223 and other devices within the vehicle. Accordingly, the processor 205 may receive data through the various interfaces connected to the management system 201. Additionally, the processor 205 may execute instructions stored in the storage 207 and store information received through the interfaces in the storage 207.

In certain embodiments, the navigation system 203 is a device that provides information related to the navigation solution of the vehicle. In some embodiments, the navigation system 203 may measure the motion of the vehicle and calculate a navigation solution for the vehicle based on the measurements. Alternatively, the navigation system 203 may measure the motion of the vehicle and provide the measurements (fused measurements from multiple sensors, processed measurements, raw measurement data, etc.) to the management system 201, where the management system 201 calculates the navigation solution for the vehicle.

To measure the motion of the vehicle, the navigation system 203 may include sensors 215. The sensors 215 may be devices that acquire information about the environment and the motion of the vehicle. For example, the sensors 215 may include global navigation satellite system receivers, IMUs, gyroscopes, accelerometers, barometers, altimeters, velocimeters, thermometers, magnetometers, hygrometers, and other sensors that provide information related to the navigation state of the vehicle.

In further embodiments, the navigation system 203 may include a processor 209. The processor 209 functions similarly to the processor 205 in that the processor 209 executes instructions and processes data received from memory storage devices and other data-producing devices (such as the sensors 215).

In certain embodiments, the navigation system 203 may include a transceiver 213, where the transceiver 213 is designed to receive signals associated with multiple approach modes for facilities located at various destinations to which the vehicle could travel. For example, the transceiver 213 may be a multi-mode receiver (MMR), an integrated MMR (IMMR), or other devices facilitating communication between an approach system and the vehicle. Additionally, the transceiver 213 may include multiple receivers that are configured to receive signals from facilities associated with the different approach modes. In some implementations, the transceiver 213 may include processing capabilities that perform some of the functionality ascribed to the processor 209. In particular, the transceiver 213 may include logic for selecting an approach mode.

In exemplary embodiments, the transceiver 213 receives GNSS signals. For example, the transceiver 213 may receive GNSS signals through one or more antennas 211 to support approach modes that use GNSS measurements. In some implementations, the transceiver 213 may be tuned to receive one or more VHF Data Broadcast (VDB) signals transmitted from some of the ground-based approach facilities at an airport to provide corrections to the GNSS measurements (such as in ground-based augmentation system (GBAS)). Upon receipt of sufficient GNSS signals from GNSS satellites, the transceiver 213, processor 209, or processor 205 may determine the distance between the transceiver 213 and the GPS satellites and the position of the GPS satellites. Based on the determined distances and positions, along with corrections from a GBAS or a satellite-based augmentation system (SBAS), the processor 209 determines various navigation parameters that include, for example, aircraft position, groundspeed, and ground track angle. The processor 209 (or the processor 205) may calculate deviations from an intended approach path and distance to threshold at a particular destination using the navigation parameters and corrections.

In additional embodiments, the transceiver 213 may receive VHF, MLS, or other signals from approach facilities. For example, the transceiver 213 may be tuned to receive VHF signals through the antenna 211 from a ground station (such as an external system 225) associated with a particular approach destination. In some implementations, the transceiver 213 may receive the VHF and GNSS signals simultaneously through separate antennas 211. The VHF signals may include corrections for GNSS signals. Also, the VHF signals may include broadcast information used to define a reference path typically leading to the approach destination.

In further embodiments, the transceiver 213 may receive radio signals related to an ILS. For example, the transceiver 213 may be tuned to receive two directional radio signals. One of the radio signals is a localizes signal that provides horizontal guidance, and the other radio signal is a glideslope signal that provides vertical guidance. The processor 209 or the processor 205 receives and processes the radio signals to determine the relationship between the vehicle position and the signals.

In certain embodiments, the navigation system 203 further includes various databases for storing information. As illustrated, the navigation system 203 stores an approach database 221. Additionally, the navigation system 203 may also store other databases that contain approach models for specific approach modes, such as an LPV database. The approach database 221 (and other databases) is stored on a memory device on the navigation system 203 or in the storage 207. Further, the approach database 221 stores approach identifiers and approach information. As used herein, an approach identifier is a code, name, number, or other means for identifying a specific approach destination. Further, "approach information" refers to information describing the approach systems available at an approach destination described by a particular approach identifier. Also, the approach information may include connectivity information that can be used by the processor 209 to establish communications or receive signals associated with a particular approach mode. For example, the approach database 221 may store an approach identifier for an approach destination and then associate approach information for that approach destination with the approach identifier.

In exemplary embodiments, the approach database 221 may be updated to ensure that the approach database 221 has the information describing at least the approaches used by the associated vehicle. To update the approach database 221, to get approach information associated with the region where the vehicle is located, or other subset of the available approach information the approach system 223 may communicate periodically with an external system 225. The external system 225 may be any system that provides approach information located outside of the vehicle. The external system 225 may be a ground station, another aircraft, a mobile communication system, an air traffic controller (ATC) center, an airline operation center, or other system that can communicate with the approach system 223.

In some embodiments, the external system 225 includes a transceiver 231 The transceiver 231 can transmit and receive communications with the approach system 223 through an antenna 233. Additionally, the external system 225 includes a processor 229. The processor 229 may function similarly to the processors 209 and 205 regarding the execution of instructions. Additionally, the external system 225 may include storage 227, Which stores approach information updates for transmission to connected approach systems 223. The processor 229 communicates with the approach system 223 through the receiver 231 to transmit the approach information updates to connected approach systems 223.

In certain embodiments, the approach system 223 may request an update to the approach database 221 through the transceiver 213. In response to the requested update, the external system 225 may transmit the requested approach information updates to the approach system 223. Alternatively, when the approach system 223 is within a transmission range of the external system 225, the external system 225 may push approach information updates to the approach system 223 to update the approach database 221. Additionally, the external system 225 may provide approach information updates to the approach database 221 such that the approach database 2211 is a copy of a similar approach database stored in the storage 227. Alternatively, the external system 225 provides approach information updates for the data stored in the approach database 221, where the approach database 221 is a subset of the approach information stored in the storage 227. Additionally, the external system 225 may broadcast approach information indicating which approach modes are supported within an associated geographic location.

While the external system 225 is shown as communicating with the approach system 223 through a wireless communication link, the external system 225 may provide approach information updates to the approach database 221 through any means of data exchange. For example, the external system 225 may provide approach information updates to the approach database 221 through a wireless communication link, GateLink, a data-loader, an Ethernet connection, or other forms of communicating data between two different devices.

In certain embodiments, when selecting an approach mode, the management system 201 (or navigation system 203 and transceiver 213) may receive an approach identifier from the user interface 219. The user interface 219 may be a device through which a user can input an approach identifier. Alternatively, the approach identifier can be received from another device, transmitted from another system (like an ATC center), or identified from the location of the vehicle and approach identifiers associated with the location of the vehicle. The user interface 219 then provides the approach identifier to the processor 209 in the navigation system 203 through the management system 201. The processor 209 uses the approach identifier to look up approach information associated with the approach identifier in the approach database 221. Alternatively, some approach systems 223 may lack an approach database 221. When the approach systems 223 lack an approach database 221, the navigation system 203 may transmit the approach identifier to an external system 225, which, in response to receiving the approach identifier, transmits back approach information associated with the approach identifier to the approach system 223.

In certain embodiments, when the processor 209 acquires the approach information from the approach database 221, the processor 209 may then determine which of the approach modes, described in the approach information, provides guidance having the highest quality measure. For example, the processor 209 may determine an integrity measure for each of the approach systems. As used herein, an integrity measure may be a measurement of the trustworthiness of the measurements. For example, integrity measurements may include protection levels, exclusion thresholds, and other measurements associated with the integrity of the guidance provided through a particular approach mode. Other types of quality measures may include accuracy measures, continuity measures, and the like. After determining a quality measure for the different approach modes, the processor 209 may select the approach mode that provides measurements with the most desirable quality measure. For example, the processor 209 may select the approach mode having the measurements with the highest integrity.

In further embodiments, the processor 209 may then provide navigation guidance to the management system 201. The navigation guidance may include a measurement of the deviations of the vehicle's current path from the intended approach path. Additionally, the navigation guidance may include suggested maneuvers or corrections that can be made to bring the vehicle closer to the intended approach path. Upon receiving the navigation guidance from the processor 209, the processor 205 may provide the navigation guidance for display on one or more display devices 217 to the user. For example, the display device 217 may display the navigation guidance information as a relationship between a vehicle's position and the intended approach path.

In exemplary embodiments, after selecting the approach mode having the measurements with the highest quality measure and providing navigation guidance associated with the selected approach mode to the management system 201, the processor 209 may continue to evaluate the different approach modes associated with the approach identifier in the approach database 221. For example, the processor 209 may monitor the quality measure of the selected approach mode. If the quality measure falls below a specified quality threshold (such as a specified integrity threshold), the processor 209 may select a non-selected approach mode producing measurements with the highest quality measure. Alternatively, the processor 209 may monitor the quality measure (such as an integrity measure) of the measurements for each of the available approach modes. If the quality measure of measurements from one of the non-selected approach modes exceeds the quality measure of the measurements for the selected approach mode, the processor 209 may then select the non-selected approach mode to provide navigation guidance.

The processors 205, 209, 229, and other computational devices used in the approach system 223, the external system 225, or other systems and methods described herein, may be implemented using software, firmware, hardware, or appropriate combinations thereof. In some implementations, a single processor may execute the functionality of any combination of the processor 205 and the processor 209. For example, the functionality of the management system 201 may be incorporated in the navigation system 203, or the functionality of the navigation system 203 may be incorporated in the management system 201, such that the processor 205 or the processor 209 performs the processing tasks described above as being performed by processors in the approach system 223.

The processors 205, 209, 229, and other computational devices may be supplemented by, or incorporated in, specially-designed application-specific integrated circuits (ASICs) or field programmable gate arrays (FPGAs). In some implementations, the processors 205, 209, and/or other computational devices may communicate through an additional transceiver with other computing devices outside of the approach system 223, such as systems other than the external system 225 or computing devices associated with other subsystems controlled by the management system 201 on the vehicle. The processors 205, 209, 229, and other computational devices can also include or function with software programs, firmware, or other computer-readable instructions for carrying out various process tasks, calculations, and control functions used in the methods and systems described herein.

In some embodiments, the functions of the processors 205, 209, and 229 are performed by one or more processors. For example, the functionality of the processor 205 may be performed by multiple processors, such as a processor for communicating with the navigation system 203, a separate processor associated with the user interface 219, an additional processor for the display devices 217, and other processors for other functionality. Similarly, multiple processors may perform the functionality ascribed above to the processor 209. For example, a processor may perform calculations for the navigation solution, a separate processor may handle communications with the approach systems, and other processors may perform additional functionality.

The methods described herein may be implemented by computer-executable instructions, such as program modules or components, which are executed by at least one processor, such as the processors 205, 209, and 229. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable instructions. These instructions are typically stored on appropriate computer program products that include computer-readable media used to store computer-readable instructions or data structures. Such a computer-readable medium may be available media that can be accessed by a general-purpose or special-purpose computer or processor, or any programmable logic device. For instance, the storage 207, approach database 221, and storage 227 may be examples of a computer-readable medium capable of storing computer-readable instructions and/or data structures. The storage 207, approach database 221, and storage 227 may also store navigation information such as maps, terrain databases, magnetic field information, path data, and other navigation information. Additionally, the storage 207 may store the approach database 221, when the management system 201 and the navigation system 203 function as an integrated system within the approach system 223.

Suitable computer-readable storage media (such as the storage 207, approach database 221, and storage 227) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

Figure 3:
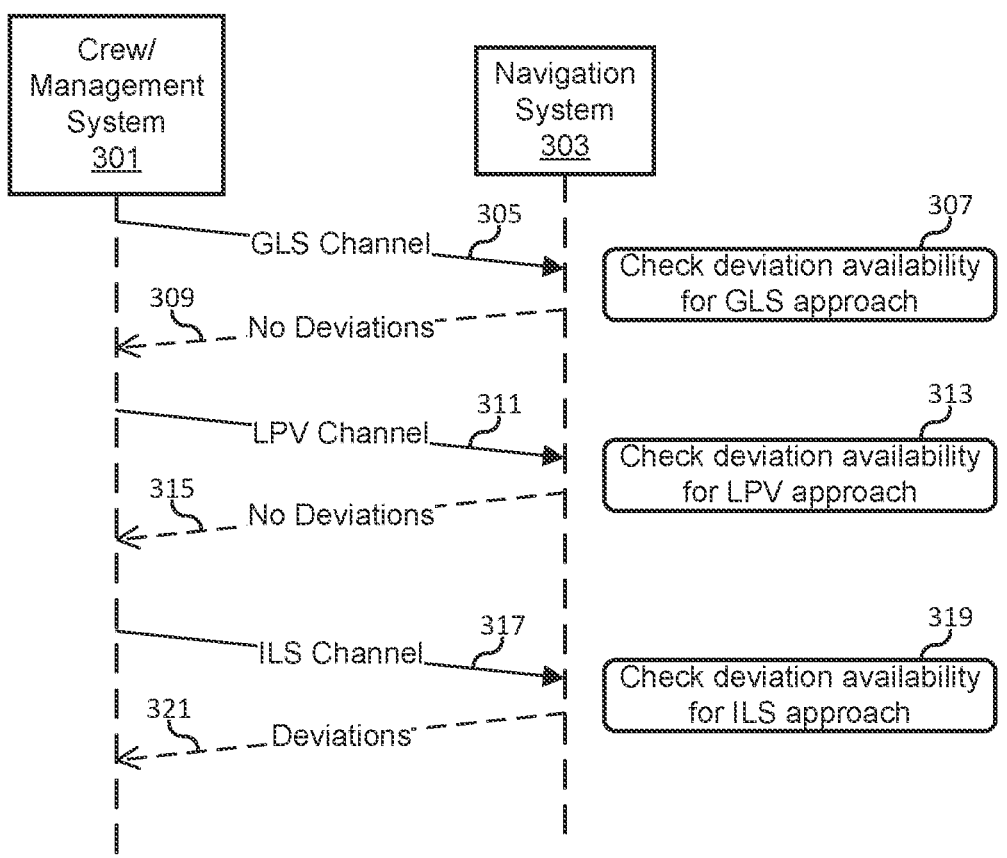
FIG. 3 is a sequence diagram illustrating a typical selection of an approach system.
Figure 4:
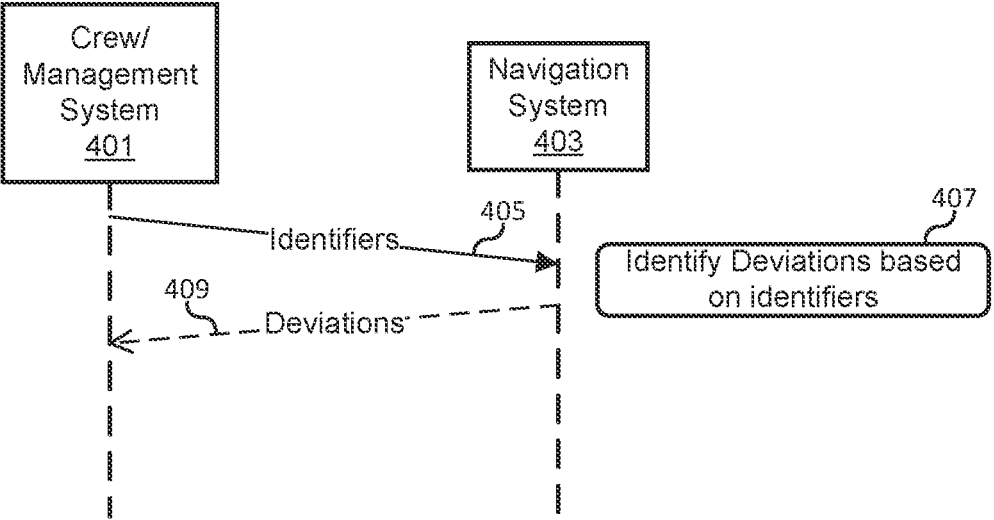
FIG. 4 is a sequence diagram illustrating the selection of an approach system according to an aspect of the present disclosure.

FIGS. 3 and 4 contrast the effects of the systems and methods described herein on the process of selecting an approach mode. For example, FIG. 3 is a sequence diagram illustrating a typical selection of an approach mode. As shown, a crew/management system 301 interacts with a navigation system 303. The crew/management system 301 may function similarly to the combination of the management system 201 connected to the display devices 217 and user interface 219 in FIG. 2, where the management system 201 receives information from a flight crew member through the user interface 219 and provides information to the flight crew member through the display devices 217.

As illustrated, when approaching an approach destination, the crew/management system 301 may begin at 305 by tuning a receiver in the navigation system 303 to a GLS channel. The navigation system 303 may then perform step 307 by checking if deviations from an intended approach path are available for a GLS approach. If there are no deviations, the navigation system 303 may proceed at 307, where the navigation system 303 notifies the crew/management system 301 that no deviations are available for a GLS approach. In response to the notification, the crew/management system 301 may proceed to 311, where the crew/management system 301 tunes the receiver in the navigation system 303 to an LPV channel. The navigation system 303 may then perform step 313 by checking if deviations from an intended approach path are available for an LPV approach. If there are no deviations, the navigation system 303 may proceed at 315, where the navigation system 303 notifies the crew/management system 301 that no deviations are available for an LPV approach. In response to the notification, the crew/management system 301 may proceed to 317, where the crew/management system 301 tunes the receiver in the navigation system 303 to an ILS channel. The navigation system 303 may then perform step 319 by checking if deviations from an intended approach path are available for an ILS approach. If there are deviations, the navigation system 303 may proceed at 321, where the navigation system 303 provides the deviations to the crew/management system 301. After receiving the deviations, the crew/management system 301 may use the ILS approach mode to follow the intended approach path towards the desired destination.

The process shown in FIG. 3 is iterative, and, in each iteration, selecting an approach mode can draw a crew member's attention away from other possibly essential tasks so that the crew member can tune the receiver to a different approach system. In contrast to the sequence of FIG. 3, FIG. 4 is a sequence diagram illustrating the selection of an approach mode in accordance with the present disclosure.

As shown, a crew/management system 401 interacts with a navigation system 403. The crew/management system 401 may function similarly to the combination of management system 201 connected to the display devices 217 and user interface 219 in FIG. 2, where the management system 201 receives information from a flight crew member through the user interface 219 and provides information to the flight crew member through the display devices 217.

As illustrated, when approaching an approach destination, the crew/management system 401 may begin at 405 by sending an approach identifier to the navigation system 403. The navigation system 403 may then perform step 407 by identifying the available approach modes associated with the approach identifier and then evaluating the deviations for the available approach modes that provide measurements with the highest quality measure. The navigation system 403 then proceeds to 409 by sending the deviations for the approach mode that have measurements with the highest quality measure to the crew/management system 401. The crew/management system 401 then may use the provided deviations to follow the intended approach path towards the destination. As shown, the process for selecting an approach mode according to systems and methods described in the present disclosure is not iterative and merely calls for a user to input an approach identifier. Thus, the systems and methods described herein provide a crew with more flexibility to attend to other essential tasks when approaching a destination.

Figure 5:
FIG. 5 is a flowchart diagram of a method for selecting an approach system according to an aspect of the present disclosure.
Figure 5:
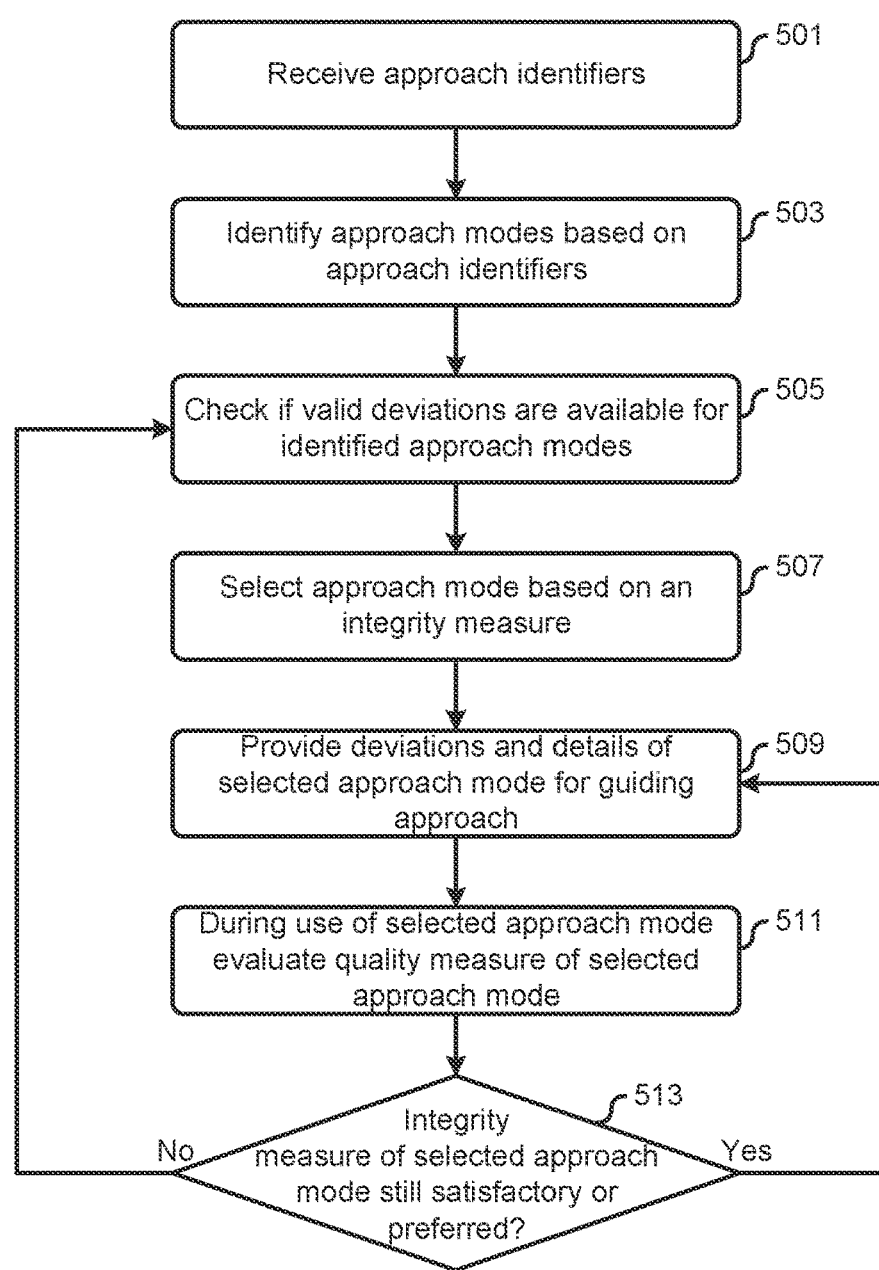

FIG. 5 depicts a flow diagram illustrating an exemplary method 500 for selecting an approach mode. The method 500 may be implemented via the techniques described with respect to FIGS. 2 and 4, but may be implemented using other techniques known to one having skill in the art. The blocks of the flow diagram have been arranged in a generally sequential manner to facilitate explanation. But, the arrangement of the blocks is merely exemplary, and the blocks can be arranged in any manner sufficient to provide the functionality described above with respect to FIGS. 2 and 4. For example, the processing associated with the methods described herein (and the blocks shown in the Figures) may occur in a different order (i.e., where at least some of the processing associated with the blocks is performed in parallel, in an event-driven manner, or both).

In certain embodiments, the method 500 illustrates the process for selecting an approach mode by an approach system, such as the approach system 223 in FIG. 2, and the steps of the method 500 are described herein with reference to the approach system 223. In particular, the method 500 proceeds at 501, where an approach identifier is received. For example, the approach system 223 may receive an approach identifier from a flight crew member through the user interface 219. Further, the method 500 proceeds at 503, where approach modes are identified based on the approach identifier. For example, the approach system 223 may search an approach database 221 for the approach identifier or receive the approach identifiers from a broadcast signal from the approach facilities. When the approach system 223 finds the approach identifier in the approach database 221, the approach system 223 may identify the approach modes associated with the approach identifier as defined in the approach database 221.

In further embodiments, the method 500 proceeds at 505, where the availability of valid deviations is checked for the identified approach modes. For instance, the approach system 223 may identify the deviations from the intended approach path for the different approach modes identified in the approach database 221 as being associated with the approach identifier.

Additionally, the method 500 proceeds at 507, where an approach mode is selected based on an integrity measure. For example, the approach system 223 may evaluate the input signals and vehicle position to determine which approach mode would achieve the highest integrity. When the approach system 223 identifies the preferred approach mode, the navigation system may then select the identified approach mode as the source for approach path deviations. As discussed above, the use of an integrity measure is an example of a type of quality measure.

In alternative embodiments, when the approach mode is selected at 507, the approach system 223 may provide the viability of the available approach modes, as determined by the approach system 223 to a user (such as a pilot or crew member) through the display devices 217 and/or user interface 219. The approach system 223 may also communicate the relative preference of the available approach modes in relation to one another. A pilot or other crew members can use instrumentation (such as the user interface 219) to select one of the available approach modes based on the provided information. As part of selecting one of the approach modes, the pilot or other crew member may request that an ATC center authorize the selected approach mode. Alternatively, the pilot or other crew member may also evaluate whether a specific approach mode commanded by an ATC center is feasible for an aircraft. Additionally, the viability of the available approach modes, as determined by the approach system 223 may be transmitted to the made available to the ATC center. In response to the transmission of available approach modes, the ATC center may request that the pilot or other crew member select one of the available approach modes. The embodiment allows the possibility for the ATC to request the pilot or other crew member to select an approach system that the aircraft's navigation system 203 has determined is suitable to the approach.

Moreover, the method 500 proceeds at 509, where deviations and details of the selected approach mode are provided for guiding a vehicle along an approach path. For example, the approach system 223 may provide the deviations and other details to the management system 201 and the flight crew for guiding the vehicle along the intended approach path.

In additional embodiments, the method 500 proceeds at 511, where the integrity measure of the selected approach mode is evaluated during the use of the selected approach mode. For example, the approach system 223 may continue to evaluate the integrity measure of the deviations provided by the selected approach mode while the deviations are being used to guide the vehicle along the intended approach path. Also, the approach system 223 may evaluate the integrity measure of the available deviations provided by the non-selected approach mode(s). The method 500 then proceeds at 513, where a determination is made as to whether the integrity measure of the selected approach mode remains satisfactory. For example, the approach system 223 may determine that the integrity measure of the selected approach mode is satisfactory if the integrity measure is above a specified level. Alternatively, the approach system 223 may determine the integrity measure of the deviations associated with the selected approach mode are satisfactory if the integrity measure is above the integrity measure of the deviations provided by the non-selected approach mode(s). If the integrity measure is satisfactory, the method 500 returns to 509, where the deviations are still used for guiding the vehicle along an intended approach path. If the integrity measure is unsatisfactory, the method 500 returns to 505, where the availability of valid deviations are checked for the identified approach modes.

Figure 6:
FIG. 6 is a flowchart diagram of a method for selecting an approach system according to an aspect of the present disclosure.
Figure 6:
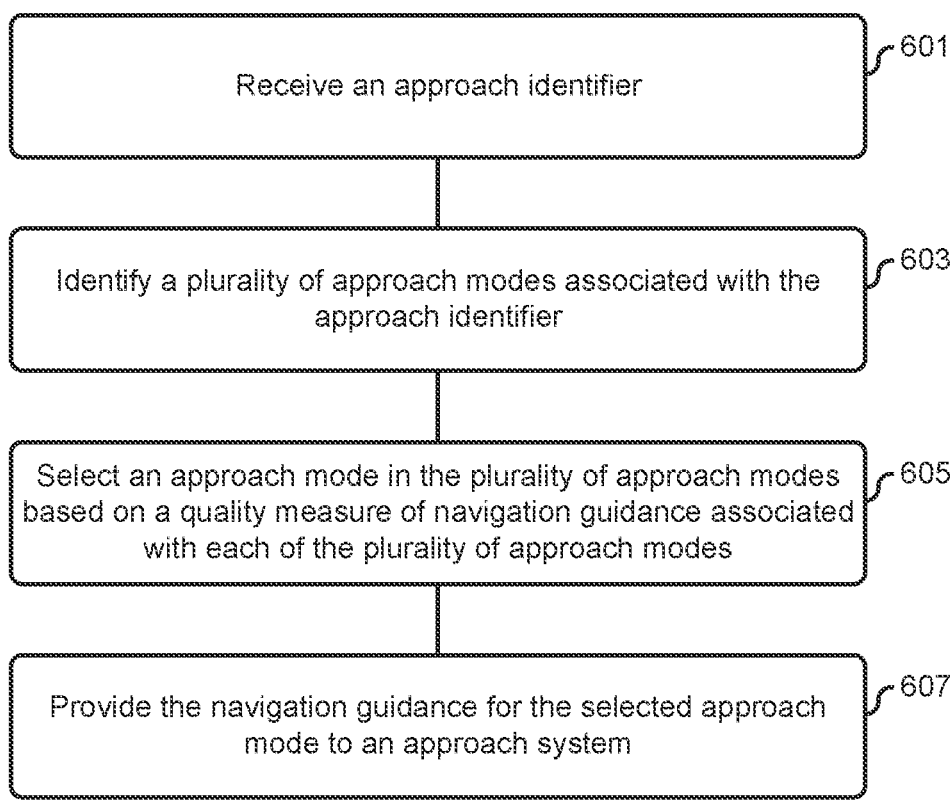

FIG. 6 depicts a flow diagram illustrating an exemplary method 600 for selecting an approach mode. The method 600 may be implemented via the techniques described with respect to FIGS. 2, 4, and 5, but may be implemented using other techniques known to one having skill in the art. The blocks of the flow diagram have been arranged in a generally sequential manner to facilitate explanation. But, the arrangement of the blocks is merely exemplary, and the blocks can be arranged in any manner sufficient to provide the functionality described above with respect to FIGS. 2, 4, and 5. For example, the processing associated with the methods described herein (and the blocks shown in the Figures) may occur in a different order (i.e., where at least some of the processing associated with the blocks is performed in parallel, in an event-driven manner, or both).

In certain embodiments, the method 600 proceeds at 601, where an approach identifier is received. Further, the method 600 proceeds at 603, where a plurality of approach modes associated with the approach identifier are identified. Additionally, the method 600 proceeds at 605, where an approach mode in the plurality of approach modes is selected based on the quality measure of navigation guidance associated with each of the plurality of approach modes. Moreover, the method 600 proceeds at 607, where the navigation guidance for the selected approach mode is provided to an approach system.

EXAMPLE EMBODIMENTS

Example 1 includes a method comprising: receiving an approach identifier; identifying a plurality of approach modes associated with the approach identifier; selecting an approach mode in the plurality of approach modes based on an integrity measure of navigation guidance associated with separate approach modes in the plurality of approach modes; and providing the navigation guidance for the selected approach mode to an approach system for guiding a vehicle through an approach for the selected approach mode.

Example 2 includes the method of Example 1, wherein the approach identifier identifies a runway.

Example 3 includes the method of any of Examples 1-2, wherein the navigation guidance comprises deviations from an intended approach path for the selected approach mode.

Example 4 includes the method of any of Examples 1-3, wherein identifying the plurality of approach modes associated with the approach identifier comprises acquiring approach information from an approach database stored in one or more storage devices on the vehicle.

Example 5 includes the method of Example 4, further comprising: receiving approach information updates; and updating the approach database with the approach information updates.

Example 6 includes the method of any of Examples 1-5, wherein identifying the plurality of approach modes comprises: transmitting the approach identifier to an external system; and receiving approach information from the external system, wherein the approach information identifies the plurality of approach modes associated with the approach identifier.

Example 7 includes the method of any of Examples 1-6, further comprising evaluating the selected approach mode based on the integrity measure while the vehicle uses the navigation guidance for the selected approach mode.

Example 8 includes the method of Example 7, wherein evaluating the selected approach mode comprises monitoring the integrity measure of the selected approach mode, wherein a second approach mode is selected when the integrity measure of the selected approach mode is below a specified integrity threshold.

Example 9 includes the method of any of Examples 7-8, wherein evaluating the selected approach mode comprises: continuing to monitor the integrity measure of the separate approach modes; and selecting a different approach mode in the plurality of approach modes over the selected approach mode based on the integrity measure for the plurality of approach modes.

Example 10 includes the method of any of Examples 1-9, wherein selecting an approach mode further comprises providing an assessment of the suitability of each of the plurality of approach modes.

Example 11 includes a system comprising: one or more processors on a vehicle; and at least one receiver coupled to the one or more processors; wherein the one or more processors executes computer-executable instructions that direct the one or more processors to: receive an approach identifier; identify a plurality of approach modes associated with the approach identifier; select an approach mode in the plurality of approach modes based on a quality measure of navigation guidance associated with separate approach modes in the plurality of approach modes; provide the navigation guidance for the selected approach mode to an approach system for guiding the vehicle through an approach for the selected approach mode; and evaluate the selected approach mode based on the quality measure while guiding the vehicle through an approach associated with the selected approach mode.

Example 12 includes the system of Example 11, further comprising a storage device having an approach database stored thereon, wherein approach information is stored on the approach database.

Example 13 includes the system of Example 12, wherein the computer-executable instructions further direct the one or more processors to update the approach database with approach information updates received from an external system through the at least one receiver.

Example 14 includes the system of any of Examples 12-13, wherein the computer executable instructions direct the one or more processors to identify the approach information by identifying the approach information in the approach database.

Example 15 includes the system of any of Examples 12-14, wherein the computer executable instructions direct the one or more processors to identify the approach information by: transmitting the approach identifier to an external system; and receiving the approach information from the external system, wherein the approach information identifies the plurality of approach modes associated with the approach identifier.

Example 16 includes the system of any of Examples 11-15, wherein the quality measure is an integrity measure of the navigation guidance.

Example 17 includes the system of any of Examples 11-16, wherein the computer executable instructions direct the one or more processors to evaluate the selected approach mode by: monitoring the quality measure of the selected approach mode; and when the quality measure is below a specified level, selecting a different approach mode based on the quality measure of non-selected approach modes in the plurality of approach modes.

Example 18 includes the system of any of Examples 11-17, wherein the computer executable instructions direct the one or more processors to evaluate the selected approach mode by: continuing to monitor the quality measure of the separate approach modes; and selecting a second approach mode in the plurality of approach modes over the selected approach mode based on the quality measure for the plurality of approach modes.

Example 19 includes the system of any of Examples 11-18, wherein the navigation guidance comprises at least one of deviations and distance to threshold from an intended approach path for the selected approach mode.

Example 20 includes a system comprising: one or more processors on a vehicle; and at least one receiver coupled to the one or more processors; wherein the one or more processors executes computer-executable instructions that direct the one or more processors to: receive an approach identifier; identify a plurality of approach modes associated with the approach identifier; select an approach mode in the plurality of approach modes based on an integrity measure of navigation guidance associated with separate approach modes in the plurality of approach modes; provide the navigation guidance for the selected approach mode to an approach system for guiding the vehicle through an approach for the selected approach mode; and evaluate the selected approach mode based on the integrity measure while guiding the vehicle through the selected approach.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
receiving an approach identifier for selecting an initial approach mode, wherein the initial approach mode is a system for providing initial guidance to a vehicle towards a destination;
identifying a plurality of approach modes associated with the approach identifier, wherein each approach mode in the plurality of approach modes represents a system for providing guidance along an approach;
identifying approach modes in the identified plurality of approach modes having valid deviations from an associated approach;
determining an integrity measure of navigation guidance for the identified approach modes having valid deviations in the identified plurality of approach modes, wherein the integrity measure quantifies reliability of measurements for the identified approach modes and specifies at least one of an exclusion threshold and a protection level of the measurements;
selecting an approach mode in the identified approach modes to be the initial approach mode using the determined integrity measure of navigation guidance associated with the identified approach modes in the plurality of approach modes, wherein no approach modes have been selected before the selection of the initial approach mode;
providing the navigation guidance for the initial approach mode to an approach system;
guiding a vehicle through an approach for the initial approach mode;

continuing to monitor integrity measures for the plurality of approach modes while the vehicle uses the navigation guidance for the initial approach mode;
determining at least one of that the integrity measure of the initial approach mode fails a comparison against a specified integrity threshold, and a second integrity measure associated with a second approach mode indicates that the second approach mode has better integrity; and
automatically selecting the second approach mode based on the determination.

2. The method of claim 1, wherein the approach identifier identifies a runway.

3. The method of claim 1, wherein the navigation guidance comprises deviations from an intended approach path for the initial approach mode.

4. The method of claim 1, wherein identifying the plurality of approach modes associated with the approach identifier comprises acquiring approach information from an approach database stored in one or more storage devices on the vehicle.

5. The method of claim 4, further comprising:
receiving approach information updates; and
updating the approach database with the approach information updates.

6. The method of claim 1, wherein identifying the plurality of approach modes comprises:
transmitting the approach identifier to an external system; and
receiving approach information from the external system, wherein the approach information identifies the plurality of approach modes associated with the approach identifier.

7. The method of claim 1, wherein selecting an approach mode to be the initial approach mode further comprises providing an assessment of the suitability of each of the plurality of approach modes.

8. A system comprising:
one or more processors on a vehicle; and
at least one receiver coupled to the one or more processors;
wherein the one or more processors executes computer-executable instructions that direct the one or more processors to:
receive an approach identifier for selecting an initial approach mode, wherein the initial approach mode is a system for providing initial guidance to a vehicle towards a destination associated with the approach identifier;
identify a plurality of approach modes associated with the approach identifier, wherein each approach mode in the plurality of approach modes represents a system for providing guidance along an approach;
identify approach modes in the identified plurality of approach modes having valid deviations from an associated approach;
determine an integrity measure of navigation guidance for the identified approach modes having valid deviations in the identified plurality of approach modes, wherein the integrity measurement quantifies reliability of measurements for the identified approach modes and specifies at least one of an exclusion threshold and a protection level of the measurements;
select an approach mode in the identified approach modes to be the initial approach mode using the integrity measure of navigation guidance associated with the identified approach modes in the plurality of approach modes, wherein no approach modes have been selected before the selection of the initial approach mode;

provide the navigation guidance for the initial approach mode to an approach system;

guide the vehicle through an approach for the initial approach mode; and continue to evaluate the initial approach mode and other approach modes in the plurality of approach modes based on the integrity measure while guiding the vehicle through an approach associated with the initial approach mode;

determine at least one of that the integrity measure of the initial approach mode fails a comparison against a specified threshold, and a second integrity measure associated with a second approach mode in the plurality of approach modes indicates that the second approach mode has better integrity; and automatically select the second approach mode based on the determination.

9. The system of claim 8, further comprising a storage device having an approach database stored thereon, wherein approach information is stored on the approach database.

10. The system of claim 9, wherein the computer-executable instructions further direct the one or more processors to update the approach database with approach information updates received from an external system through the at least one receiver.

11. The system of claim 9, wherein the computer executable instructions direct the one or more processors to identify the approach information by identifying the approach information in the approach database.

12. The system of claim 9, wherein the computer executable instructions direct the one or more processors to identify the approach information by:

transmitting the approach identifier to an external system; and receiving the approach information from the external system, wherein the approach information identifies the plurality of approach modes associated with the approach identifier.

13. The system of claim 8, wherein the navigation guidance comprises at least one of deviations and distance to a threshold from an intended approach path for the initial approach mode.

14. A system comprising:

one or more processors on a vehicle; and at least one receiver coupled to the one or more processors;

wherein the one or more processors executes computer-executable instructions that direct the one or more processors to:

receive an approach identifier for selecting an initial approach mode wherein the initial approach mode is a system for providing initial guidance to a vehicle towards a destination associated with the approach identifier;

identify a plurality of approach modes associated with the approach identifier, wherein each approach mode in the plurality of approach modes represents a system for providing guidance along an approach;

identify approach modes in the identified plurality of approach modes having valid deviations from an associated approach;

determine an integrity measure of navigation guidance for the identified approach modes having valid deviations in the identified plurality of approach modes, wherein the integrity measure quantifies reliability of measurements for the identified approach modes and comprises at least one of a protection level and an exclusion threshold;

select an approach mode in the plurality of approach modes to be the initial approach mode using the integrity measure of navigation guidance associated with identified approach modes in the plurality of approach modes, wherein no approach modes have been selected before the selection of the initial approach mode;

provide the navigation guidance for the initial approach mode to an approach system;

guide the vehicle through an approach for the initial approach mode; and continue to evaluate the initial approach mode and other approach modes in the plurality of approach modes based on the integrity measure while guiding the vehicle through the initial approach;

determine at least one of that the integrity measure of the initial approach mode fails a comparison against a specified threshold, and a second integrity measure associated with a second approach mode in the plurality of approach modes indicates that the second approach mode has better integrity; and automatically select the second approach mode based on the determination.

* * * * *